(12) United States Patent
Tangirala et al.

(10) Patent No.: US 8,978,387 B2
(45) Date of Patent: Mar. 17, 2015

(54) HOT GAS PATH COMPONENT COOLING FOR HYBRID PULSE DETONATION COMBUSTION SYSTEMS

(75) Inventors: Venkat Eswarlu Tangirala, Niskayuna, NY (US); Narendra Digamber Joshi, Schenectady, NY (US); Adam Rasheed, Glenville, NY (US); Brian Gene Brzek, Clifton Park, NY (US); Douglas Carl Hofer, Clifton Park, NY (US); Thomas Michael Lavertu, Clifton Park, NY (US); Fuhua Ma, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1051 days.

(21) Appl. No.: 12/974,085

(22) Filed: Dec. 21, 2010

(65) Prior Publication Data

US 2012/0151896 A1 Jun. 21, 2012

(51) Int. Cl.
*F02C 6/08* (2006.01)
*F02C 5/02* (2006.01)
*F02C 7/18* (2006.01)
*F23C 15/00* (2006.01)
*F02C 9/18* (2006.01)

(52) U.S. Cl.
CPC ... *F02C 5/02* (2013.01); *F02C 7/18* (2013.01); *F23C 15/00* (2013.01); *F02C 9/18* (2013.01); *F05D 2260/205* (2013.01)
USPC ............. 60/782; 60/39.76; 60/39.38; 60/247; 60/248; 60/806

(58) Field of Classification Search
CPC ................ F02C 5/12; F02C 6/08; F02C 9/18; F02K 7/02; F23C 15/00; Y02T 50/675
USPC ......... 707/705, 706, 708, 709, 758; 60/39.76, 60/39.38, 247, 248, 262, 782, 806
See application file for complete search history.

(56) References Cited

U.S. PATENT DOCUMENTS

| | | | |
|---|---|---|---|
| 6,305,155 B1 * | 10/2001 | Gross | 60/782 |
| 6,305,159 B1 | 10/2001 | Nagel | |
| 6,442,930 B1 | 9/2002 | Johnson et al. | |
| 6,668,542 B2 * | 12/2003 | Baker et al. | 60/247 |
| 6,840,049 B2 | 1/2005 | Ziegner | |
| 6,886,325 B2 * | 5/2005 | Norris et al. | 60/39.34 |
| 7,096,674 B2 * | 8/2006 | Orlando et al. | 60/782 |
| 7,137,065 B1 * | 11/2006 | Huang et al. | 715/205 |

(Continued)

OTHER PUBLICATIONS

Paxson et al., "Thermal Load Considerations for Detonative Combustion-Based Gas Turbine Engines", NASA/TM-2004-213190, Prepared for the 40th Joint Propulsion Conference and Exhibit cosponsored by AIAA, ASME, SAE, and ASEE, Fort Lauderdale, Florida, 16 pages, Jul. 11-14, 2004.

(Continued)

*Primary Examiner* — William H Rodriguez
*Assistant Examiner* — Lorne Meade
(74) *Attorney, Agent, or Firm* — Robert M. McCarthy

(57) ABSTRACT

The flow through the core of a hybrid pulse detonation combustion system is passed through a compressor and then separated into a primary flow, that passes directly to the combustor, and a bypass flow, which is routed to a portion of the system to be used to cool components of the system. The bypass flow is routed to a nozzle of the pulse detonation combustor. The flow is then passed back into the primary flow through the core downstream of where it was extracted.

15 Claims, 4 Drawing Sheets

(56) References Cited

U.S. PATENT DOCUMENTS

Figure 1:
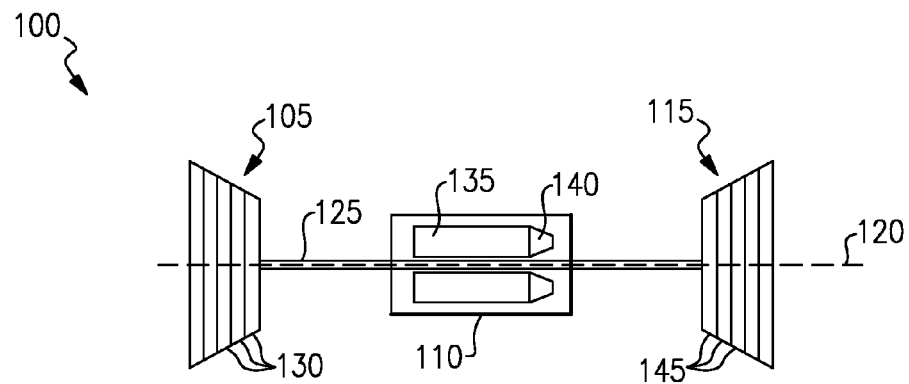

| | | | |
|---|---|---|---|
| 7,278,256 B2* | 10/2007 | Norris et al. | 60/204 |
| 7,401,064 B1* | 7/2008 | Arone et al. | 1/1 |
| 7,526,912 B2* | 5/2009 | Tangirala et al. | 60/247 |
| 7,721,523 B2* | 5/2010 | Tangirala et al. | 60/39.511 |
| 7,784,265 B2 | 8/2010 | Rasheed et al. | |
| 7,841,167 B2* | 11/2010 | Rasheed et al. | 60/248 |
| 7,966,803 B2* | 6/2011 | Chapin et al. | 60/39.76 |
| 2003/0145577 A1 | 8/2003 | Hunter et al. | |
| 2006/0260291 A1* | 11/2006 | Vandervort et al. | 60/39.76 |
| 2007/0180810 A1* | 8/2007 | Chapin et al. | 60/39.76 |
| 2007/0180814 A1* | 8/2007 | Tangirala et al. | 60/204 |
| 2008/0115480 A1* | 5/2008 | Rasheed et al. | 60/39.76 |
| 2008/0155959 A1* | 7/2008 | Rasheed et al. | 60/39.76 |
| 2009/0241507 A1* | 10/2009 | Tangirala et al. | 60/39.76 |
| 2012/0151895 A1* | 6/2012 | Tangirala et al. | 60/39.76 |
| 2012/0192545 A1* | 8/2012 | Tangirala et al. | 60/247 |

OTHER PUBLICATIONS

Georgiol, "The Traveling Cascade, Constant Volume Heat Exchanger in a Gas Turbine Lead Combined Cycle", Presented at the International Gas Turbine and Aeroengine Congress & Exhibition, Birmingham, UK, 7 pages, Jun. 10-13, 1996.

* cited by examiner

HOT GAS PATH COMPONENT COOLING FOR HYBRID PULSE DETONATION COMBUSTION SYSTEMS

TECHNICAL FIELD

The systems and techniques described include embodiments that relate to cooling for gas turbine systems. They further include embodiments that relate to cooling of systems using pulse detonation combustors.

DISCUSSION OF RELATED ART

In a traditional gas turbine engine, an incoming body of air is compressed, fuel is added to the compressed air, the fuel/air mixture is ignited and burned in a combustor, and then the hot exhaust from the combustor is allowed to expand through a turbine and out the back of the engine. The operation of the engine produces thrust in the form of increased momentum of the exhaust flow compared to the incoming flow, as well as shaft power that may be produced from the flow through the turbine.

Many variations of this basic operation exist, some optimized to produce more thrust and little or no excess shaft power, some to produce low thrust but high shaft power. However, in every case, the energy output from the system, whether thrust or shaft power, is generated by the combustion of the fuel in the combustor.

In a traditional engine, the combustion that takes place is a form of essentially constant pressure combustion, i.e., the fuel/air mixture burns without a significant increase in the pressure of the products compared to the pressure of the reactants. This is referred to as "deflagration". However, combustion that produces a pressure rise can be effective in extracting more energy from the fuel, and therefore producing more efficient combustion.

Such combustors that operate in a pressure-rise mode are generally based on detonative or quasi-detonative forms of combustion. While much effort has gone into producing various forms of detonative combustor, particularly those that operate in a pulsed manner, much work still remains in incorporating a pulse detonation combustor into the overall system of a gas turbine engine. Specifically, continued development is needed in harnessing the energy in the exhaust flow without damaging the engine components due to the higher temperatures, pressures, and shock loadings that components are subjected to by the detonation wave. In particular, the portions of the system starting at the combustor and heading downstream experience higher temperatures than in non-detonation engines.

Therefore, there exists a need to effectively and efficiently protect the downstream components from the high temperature flow produced by the pulse detonation combustor.

BRIEF DESCRIPTION

In one aspect of the systems and techniques described herein, a gas turbine system includes a pulse detonation combustor, a compressor, a turbine, and a bypass. The combustor includes a combustion tube and a nozzle located downstream from the combustion tube. The compress is in fluid communication with the combustor and is located upstream from the combustor. The turbine is located downstream of the combustor and is also in fluid communication with the combustor. The bypass is in fluid communication with the compressor and is configured to allow flow from the compressor to be routed to an external surface of the combustor nozzle.

In a further aspect of the systems described, the nozzle includes surface features that increase the surface area of the nozzle to enhance the heat transfer between the nozzle and the flow through or over the nozzle.

In another aspect of the system, the bypass flow from over the external surface of the nozzle is routed over the exterior surface of the combustion tube to cool the combustor.

In yet another aspect, the flow over the combustor tube is then routed into the combustor to merge with the primary flow from the compressor.

In another aspect, a pump is included in the bypass flow path in order to boost the pressure of the flow through the bypass. In further aspects, such flow is then delivered through the wall of the nozzle and merged with the primary flow inside the nozzle.

BRIEF DESCRIPTION OF DRAWING FIGURES

Figure 2:
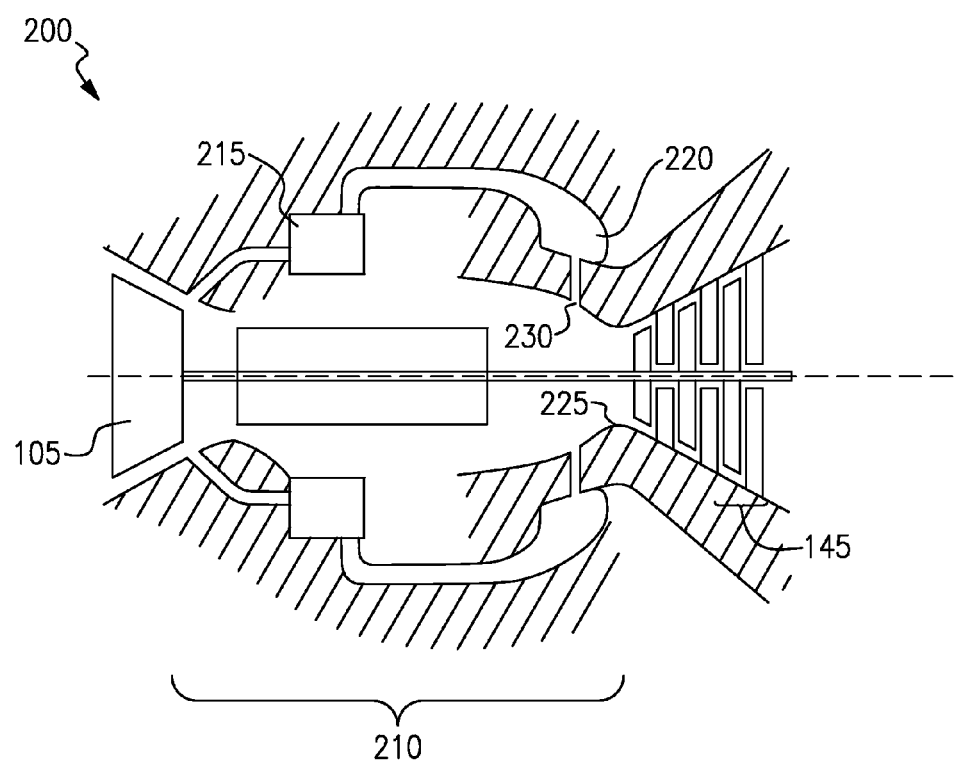
Figure 3:
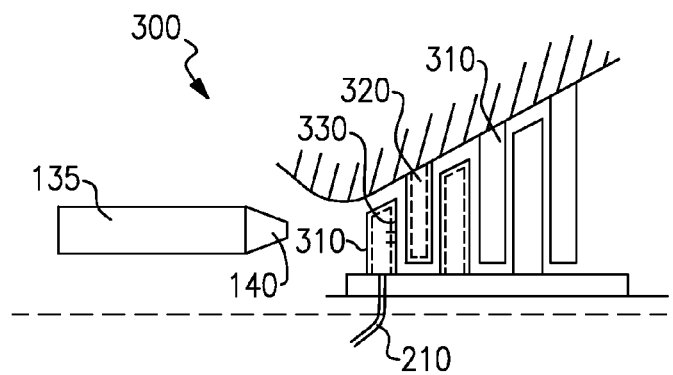
Figure 4:
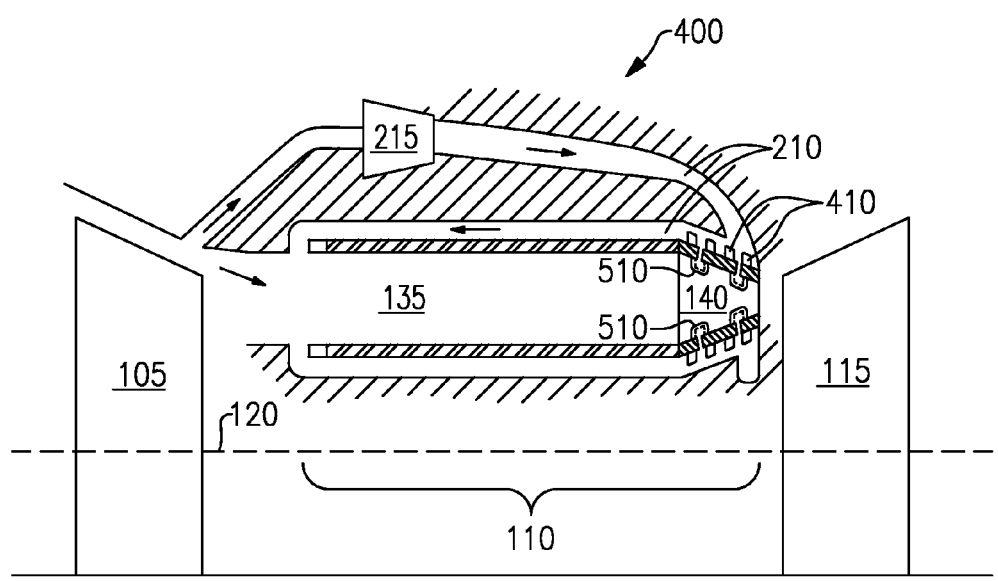
Figure 5:
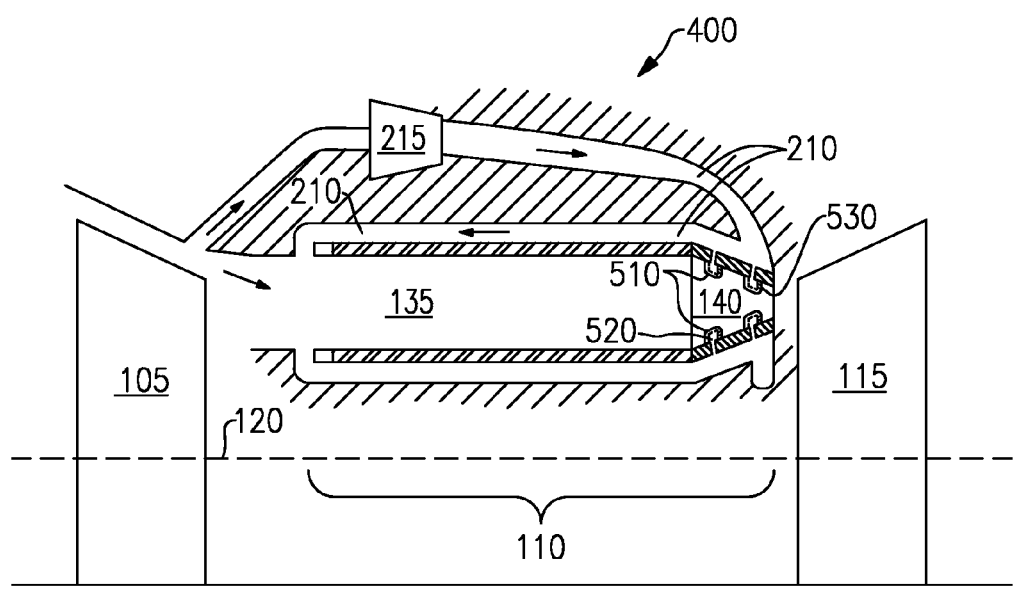
Figure 6:
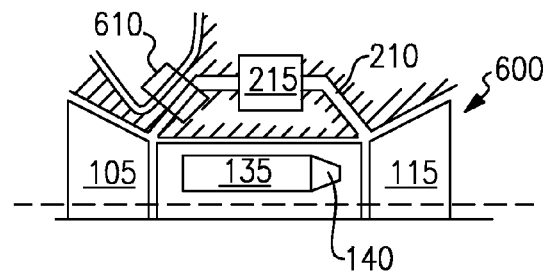
Figure 7:
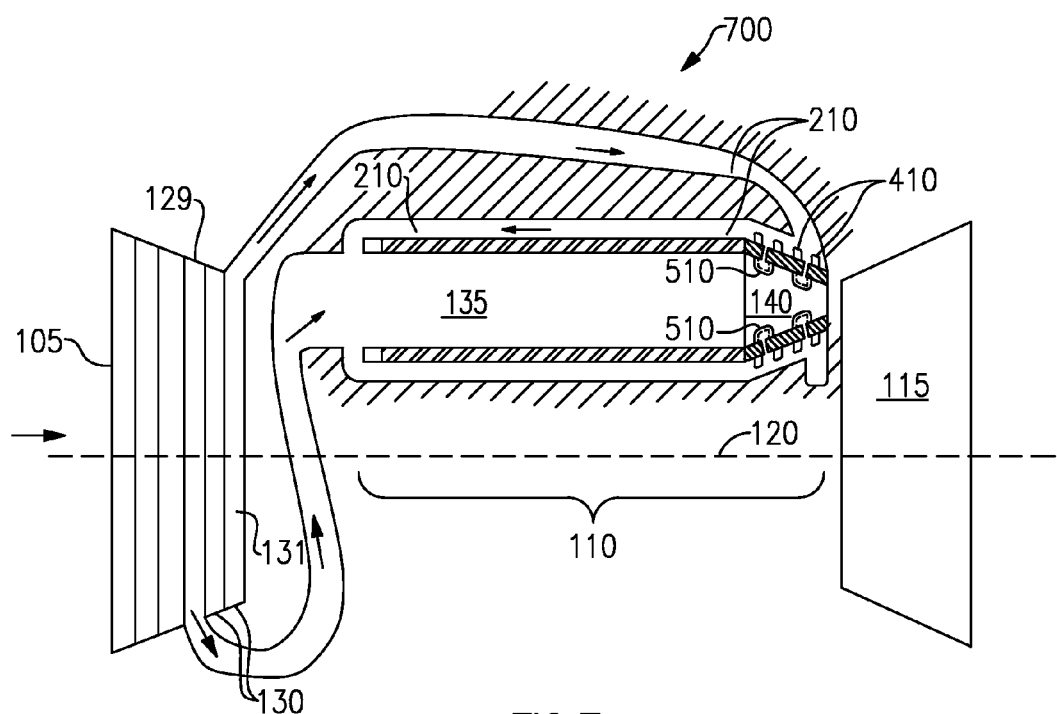

The techniques and systems are described herein with reference to the drawings which contain the following figures, in which like reference numerals indicate like parts:

FIG. 1 schematically illustrates a core gas turbine having a pulse detonation combustor;

FIG. 2 schematically illustrates a core gas turbine having a cooling bypass between the compressor and turbine in accordance with one embodiment of the systems described herein;

FIG. 3 schematically illustrates a core gas turbine having a cooling bypass between the compressor and turbine accordance with another embodiment of the systems described herein;

FIG. 4 schematically illustrates a core gas turbine having a cooling bypass between the compressor and combustor nozzle in accordance with an embodiment of the systems described herein;

FIG. 5 schematically illustrates a core gas turbine having a cooling bypass between the compressor and combustor nozzle in accordance with another embodiment of the systems described herein;

FIG. 6 schematically illustrates a core gas turbine having a chiller integrated into the bypass flow in accordance with yet another embodiment of the systems described herein; and FIG. 7 schematically illustrates a core gas turbine having a cooling bypass between the compressor and combustor nozzle in accordance with another embodiment of the systems described herein.

DETAILED DESCRIPTION

As discussed above, gas turbine engines making use of a pulse detonation combustor (PDC) or other pressure-rise combustor in combination with a turbine have cooling requirements that differ from those of an ordinary gas turbine. A generic hybrid PDC gas turbine engine is described below with reference to FIG. 1.

As noted above, the term "pulse detonation combustor" or "PDC" is used to refer generally to any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave, such as that experienced in a traditional gas-turbine. Embodiments of PDCs will generally include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

In the descriptions that follow, the term "axial" refers broadly to a direction parallel to the axis about which the rotating components rotate. This axis runs from the front to the back of the engine. The term "radial" refers broadly to a direction that is perpendicular to the axis of rotation of the rotating components and that points towards or away from the axis. A "circumferential" direction at a given point is a direction that is normal to the local radial direction and normal to the axial direction as well.

An "upstream" direction refers to the direction from which the local flow is coming, while a "downstream" direction refers to the direction in which the local flow is traveling. In the most general sense, flow through the system tends to be from front to back, so the "upstream direction" will generally refer to a forward direction, while a "downstream direction" will refer to a rearward direction. In the specific examples given, the inlet is on the upstream, front side of the system, and the outlet is on the downstream, rear side of the system. However, it will be understood that certain portions of the flow through the systems described may be in a direction other than toward the back of the engine.

In addition to the axial and radial directions, the systems described herein may also be described with respect to a coordinate system of three perpendicularly oriented axes that will be referred to as the "longitudinal", "lateral" and "transverse" directions. The longitudinal direction extends from front to back and is the same as the "axial" direction in all of the examples given herein. It will be understood that in other embodiments, the axes of rotation of various components may be oriented along other axes, but all examples described herein will use axes of rotation such that the longitudinal and axial directions are aligned. The lateral direction is defined as a direction normal to the axial direction that extends from one side of the system to the other. The transverse direction is normal to both the longitudinal and lateral directions and extends from the top of the system to the bottom.

FIG. 1 shows an embodiment of a hybrid gas turbine system 100 schematically. The system includes several high-level components, including a compressor 105, a combustor 110, and a turbine 115. These components are generally disposed along a axis of the system 120 about which the rotating components, such as the compressor and turbine, spin. A shaft 125 connects the rotating components and allows for rotational motion generated in the turbine to turn the compressor, and also to provide motive power to a generator or other mechanical device to extract work from the system in power-generating applications.

The compressor 105 receives a flow of air via an inlet (not shown) or other path, and the rotation of the compressor raises the pressure of this flow through the system. It will be appreciated by those of skill in the art that compressors generally include a plurality of stages 130, which include a row of rotating blades, known as a rotor, and a set of stationary blades, known as a stator. The operation of each stage of the compressor raises the pressure of the fluid in the primary flow through the compressor, and also generally raises the temperature of the fluid as well. Compressor designs are well known in the art, and can include both purely axial-flow compressors, as well as centrifugal compressors.

The primary flow through the compressor 105 is passed to the combustor 110. In the illustrated embodiment, the combustor is a pulse detonation combustor, but any pressure-rise combustor may be used in the systems described. As discussed above, a PDC is unlike an ordinary combustor, such as an annular combustor in which the pressure drops due to flow obstructions through the combustor, in that any pressure drops due to the flow through the body of the combustor are more than offset during combustion by the increase in pressure produced by the detonation. The combustor includes one or more combustion tubes 135 in which the actual combustion takes place. As known in the art, the combustor may include a variety of subcomponents used to manage the operation of the pulsed-detonation combustor, such as air valves to control the flow into the tube, fuel valves and injectors to provide for appropriate distribution of fuel within the tube, ignition systems to initiate combustion, deflagration-to-detonation components to produce detonations within the combustor tube, and control systems to regulate the operation of the air and fuel flow devices. These devices are known in the art and are not shown in FIG. 1.

In operation, the combustion tube 135 is first filled with a flow of air, taken from the primary flow through the compressor 105, and mixed with an appropriate level of fuel. Once the tube is filled to a desired level with a combustible fuel/air mixture, the mixture is ignited, and the combustion proceeds to produce a detonation wave, which advances through the tube. This detonation wave produces high temperature combustion products that are at an increased pressure when compared to the pre-combustion state.

The combustion products blow out the downstream side of the pulse detonation combustor tube 135, and flow downstream. Once appropriate energy has been extracted from the combustion, further flow from the compressor enters the tube to purge any remaining combustion products, and then the filling cycle begins again.

Note that during the filling and purge portions of the operation of the tube 135, the flow within the tube generally has the same temperature and pressure as the flow exiting the compressor 105. During the combustion and blow-down phases, the temperature and pressure within the tube are generally higher than the compressor exit temperature/pressure. As a result, the average pressure immediately downstream of the combustor tube is generally higher than the compressor exit pressure. Calculation and experiment have shown that the peak combustor exit pressure may be about 30% higher than the compressor exit pressure.

In order to control the flow out of the tube 135, a nozzle 140 is included in various embodiments. The nozzle can be used to direct the flow from the combustor tube 135 into an appropriate portion of the turbine 115. As discussed above, multiple tubes 135 may be present within a single combustor, and each may have its own nozzle. The multiple tubes/nozzles may all be disposed within a single combustor housing which surrounds all of the tubes.

The exhaust flow from the combustor 110 is directed to the turbine 115. The turbine includes multiple stages 145, similar to those of the compressor 105. Each stage includes a rotor, having rotating blades, and a stator, which includes stationary blades. The rotating blades are disposed upon a hub connected to shaft 125.

This general system as described is referred to as a gas turbine "core" herein. It will be appreciated by those of skill in the art that additional compressors, fans or other devices (not shown) may be disposed upstream of the core gas turbine in some embodiments, and similarly, additional turbine stages may be included downstream of the illustrated turbine in some embodiments. Such systems that include multiple turbines and compressors can be formed without deviating from the systems and techniques described herein in a manner similar to that known in the art with regard to non-PDC systems.

As discussed above, the exhaust flow from the combustor 110 in such a PDC-based system has a higher temperature and pressure than would be seen in a similarly configured traditional gas turbine, even one with the same compressor exit pressure and fuel type. By virtue of the detonation combustion, the pressure in the flow is greater than the compressor exit during the combustion and blow-down phases. This subjects the components downstream of the combustor to an environment that is under greater pressure and is also hotter than would be seen in the comparable location in a traditional gas turbine.

In particular, the combustor, including both the tube 135 and nozzles 140, and the most upstream stages of the turbine 115 are subjected to temperatures that can be detrimental to the service life of these components. Maintaining a suitable temperature for these components can be desirable to preserve their structural integrity. In addition to the possible damages that can be caused by exceeding the melting temperature of the material from which the nozzle and/or turbine are made, operating at a higher temperature also generally results in a lower yield strength for these materials, which can lead to undesirable deformation of the components.

Such deformation is a particular risk for rotating components, such as the turbine rotor blades, which are not only subject to the forces associated with the exhaust flow from the combustor, but which are also subject to continual centrifugal stress due to their rotation. In addition, the cyclic operation of a PDC, when compared to a traditional constant pressure combustor, produces pressure fluctuations that impose a varying axial stress upon the turbine components that can also affect component life.

Because of these increased stresses and increased temperatures, it is desirable to maintain the temperature of these components downstream of the PDC within allowable limits for the chosen materials, similar to those experienced in a non-PDC system.

In order to limit the temperature of these components, a cooling flow can be used to transfer heat out of the components, or to limit the heat transfer into the components. Any source of flow that is below the desired temperature limits can be used provide such a cooling flow.

In one embodiment, as illustrated in FIG. 2, a core gas turbine system 200 with a bypass 210 is illustrated. As can be seen, the compressor, combustor, and turbine are as described above. The bypass 210 provides a flow path in fluid communication with the compressor 105 and the turbine 115 that does not go directly through the combustor 110. Generically, the bypass allows for the delivery of flow diverted from the primary flow through the compressor to points downstream in the engine.

Although it will be appreciated that the flow from the compressor 105 will still be at a higher temperature than the flow entering the compressor, such fluid will not have been heated further by the combustion process. Therefore, the fluid entering the bypass is suitable for cooling those components that experience the temperatures associated with the combustion products, which are at an even higher temperature.

As noted above, in a PD combustor, the pressure in the flow rises during combustion. As a result, flow through the bypass 210 will not flow from the compressor 105 to those locations immediately downstream of the combustor 110 under its natural pressure. In order to overcome this adverse pressure gradient, a pump 215 or other pressure booster is included within the bypass in particular embodiments. The pump increases the pressure in the bypass flow such that it can be injected downstream of the combustor into the high temperature/high pressure exhaust flow from the combustor.

It will be understood that no such pump is necessary for embodiments that do not provide bypass flow to locations in the engine where the pressure of the primary flow has not yet been raised above the compressor output by the combustor. For example, in any embodiment in which bypass flow is rejoined to the primary flow upstream of the combustor, or into the combustor tube itself, no pump will be required to motivate the flow through the bypass 210. One such example will be discussed with respect to FIG. 4, below.

It will be appreciated that the pump 215 may take a variety of configurations, and be powered in a variety of ways. For instance, a booster pump may be run using electrical power or other power from outside of the gas turbine itself. Alternatively, the pump may be powered directly from the shaft connecting the turbine and compressor of the core system, or of an additional shaft associated with additional turbines/compressors of the system. Those of skill in the art will recognize that a variety of configurations and power sources may be associated with the pump as is desirable for any particular designed embodiment.

The cooling flow provided from the downstream end of the pump 215 can be delivered downstream within the core to provide cooling in various manners within the gas turbine system. FIG. 2 illustrates the cooling flow being directed to the turbine 115. Such cooling flow can be distributed within the turbine in various ways in different embodiments. In one embodiment, the cooling flow is delivered to a plenum 220 disposed near the inner surface of the housing 225 of the turbine. Openings 230, such as slots or holes, are disposed in the surface of the housing and provide a flow path for the bypass flow to enter the turbine. Various designs for such blowing arrangements along the surface of the turbine housing are known in the art, and can be used to provide film cooling along the surface of the housing, as well as to provide a layer which provides partial insulation to the transfer of heat from the primary exhaust flow of the combustor 110 to the turbine housing.

Other benefits may also be realized through the use of wall-blowing as shown in FIG. 2, and may include flow control, via energizing of the wall boundary layer, as well as providing mixing flow to damp the cyclic variation in the flow near the wall (where it will encounter blade tips and seals).

In an alternate embodiment 300 illustrated in FIG. 3, flow from bypass 210 is provided to the turbine in order to cool the turbine blades 310 themselves. Bypass 210 is in fluid communication with passages 320 within the turbine blades. As is understood in the art, such passages within the hollow blades can provide for internal convective cooling of the blade material directly by absorbing heat from the blade material. In addition, passages 320 terminate in openings 330 which allow the flow through the blades to join with the bulk flow past the blades. Such openings may be holes or slots, as is well known in the art, and may further provide for film cooling along the surface of the blade, and may provide an insulating flow layer as well.

Another alternate embodiment of a PDC gas turbine system 400 that includes a bypass between the compressor 105 and the combustor nozzle 140 is shown in FIG. 4. In this embodiment, the bypass flow is delivered to the nozzle disposed on the downstream end of the combustion tube 135. The nozzle may include a variety of surface features 410, such as fins, baffles, dimples, or corrugations that provide for enhanced heat transfer between a cooling flow provided via the bypass 210 and the outer surface of the nozzle. Such surface features can provide for an increase in the surface exposed to the cooling flow, and therefore enhance the heat transfer out of the nozzle, which experiences the highest temperatures associated with the detonation.

The flow over the outer surface of the nozzle 140 is then routed back along the outside of the combustion tube 135 in order to provide cooling of the combustion tube itself. The heat extracted from the nozzle and the tube increases the temperature of the bypass flow, which can then be reintegrated with the primary flow upstream of the primary flow into the combustor. In such an embodiment, the flow removed from the primary flow to pass into the bypass is returned to the primary flow with increased energy (higher temperature due to heat absorbed from the nozzle and combustion tube), partially recovering the loss of the heat that is absorbed from the combustion exhaust by the combustor tube and nozzle.

It will be appreciated that a variety of surface area enhancement features are possible beyond those discussed herein, and that any feature that provides for enhanced heat transfer between the nozzle and the bypass-provided cooling flow may be used to effectively cool the nozzle. In the particular illustrated embodiment, the feature comprises a plurality of fins that are disposed on the outer surface of the nozzle. Such cooling flow over the fins or other surface features 410 provide for enhanced convective or impingement cooling.

In some alternate embodiments, such flow may then be merged with the flow downstream of the nozzle to mix with the bulk exhaust flow rather than being routed back to the combustor tube 135 intake. This can provide similar benefits to those discussed above with regard to turbine housing cooling. It will be understood that in such embodiments that merge the bypass flow with the primary flow in a high pressure region that a pump may be used to motivate the flow through the bypass and into the high pressure portion of the primary flow, as discussed above.

In another embodiment, shown in FIG. 5, the system 500 includes a combustor 110 with a nozzle 140 that provides surface features on the inner surface of the nozzle. In the illustrated embodiment, the features are fins 510 that extend from the inner wall of the nozzle into the exhaust flow from the tube 135. However, it will be appreciated by those of skill in the art that features other than fins could be used, such as dimples, baffles, or corrugations, as discussed above. In particular embodiments, the fins 510 include internal passages 520, similar to those described above with regard to the turbine blades 320.

Such passages 520 allow for flow to pass from the bypass 210 through the nozzle 140 wall and into the fin to provide heat transfer and cooling of the fins, thus reducing the operating temperature of the nozzle. In addition, openings 530 in the fins are included to allow the cooling flow to pass through the fins and to mix with the exhaust flow through the nozzle 140. Such openings may also be configured to allow for film cooling of the fins 510.

Although the illustrated fins 510 are shown to be disposed in an axisymmetric manner about the circumference of the nozzle, it will be appreciated that a variety of shapes are possible, including fins that vary in cross section along their radial height, as well as fins that are curved to improve heat transfer.

In an alternate embodiment (not shown), the nozzle may include openings in the nozzle that allow for cooling flow to be injected through the nozzle along the inner surface of the nozzle in order to provide for cooling benefits similar to those described above with regard to the turbine housing cooling in FIG. 2.

Although varying configurations of a cooling bypass are illustrated separately in FIGS. 2-6, it will be understood that it is possible to combine multiple locations for downstream cooling through the use of a bypass that is in fluid communication with more than one downstream location. For instance, in order to provide cooling both to the nozzle and turbine, the turbine blade cooling of the embodiment shown in FIG. 3 could be combined with the nozzle exterior cooling shown in the embodiment of FIG. 4. The bypass would split the bypass flow into multiple branches that were then connected to the appropriate components.

It will be appreciated that any such combination destinations for bypass flow will be limited by the fraction of the compressor flow that is to be diverted while still retaining sufficient flow for effective combustion. In particular embodiments, a fraction of the compressor flow of about 10% may be diverted into the bypass for cooling of the nozzle. In other embodiments, the fraction may range from about 7%, about 8% or about 9% to about 11%, about 12%, or about 13% of the compressor flow. In other embodiments, a fraction of the compressor flow equal to about 5% may be diverted into the bypass for cooling of the turbine. In yet other embodiments, the fraction may range from about 2%, about 3% or about 4% to about 6%, about 7% or about 8% of the compressor flow.

In particular embodiments including cooling of multiple components, the total fraction of the compressor flow being diverted may be about 12%. In other embodiments, the total diverted flow fraction may range from about 9%, about 10%, or about 11% to about 13%, about 14%, or about 15%.

In addition, such bypass flow can also be used for the cooling of other high-temperature components within the engine. For example, in an alternate embodiment, bypass flow can be used to extract heat from bearings or seals within the engine. Such flow may comprise about 1% of the compressor flow.

Another embodiment of a PDC gas turbine with a bypass is illustrated in FIG. 6. In this system 600, the bypass 210 includes a chiller 610. The chiller reduces the temperature of the bypass flow, so that it may provide for better heat transfer and cooling of downstream components. In the illustrated system 600, the chiller is disposed upstream from the pump 215. However, it will be appreciated that the chiller my be disposed either upstream or downstream from the pump as suits the particular design requirements of the system.

The chiller 610 provides for a reduction in temperature of the cooling flow through the bypass, but also will reduce the pressure of the bypass flow. Therefore there is a need to balance the cooling benefits derived from a lower temperature bypass flow with the energy expended in pumping the flow to a sufficiently high pressure to be injected into the exhaust flow.

In some embodiments, the chiller may be an intercooler or other heat exchanger, operating in either an open or a closed cycle. In various embodiments, the pump 215 may be integrated with the chiller 610. In other embodiments, the compressor flow may be cooled by heat exchange with a heat sink at a lower temperature. Such an approach may be particular useful in ground-based applications where a large heat sink (such as a river or other natural flow of cooling fluid) is available. In some airborne applications, heat exchange to the ambient flow outside of the gas turbine may serve a similar purpose.

Another embodiment of a PDC gas turbine with a bypass is illustrated in FIG. 7. In this system 700, the primary flow may be in fluid communication with the compressor 105 at a stage 129 that is upstream of a final compressor stage 131. In such an arrangement, the primary flow may be diverted from the compressor 105 at the earlier compressor stage 129 and routed to the combustor 110. The remaining flow in the compressor 105 is further pressurized by the remaining compressor stages 130 to reach the desired pressure necessary for a bypass flow to flow through the bypass 210. In such an arrangement, the bypass flow requires no separate bypass pump, as the final compressor stages, such as a compressor stage 131, act as the pump.

The systems as described herein may be used in any application where a gas turbine system is normally used, and would benefit from the more efficient combustion process associated with a PDC process. For example, the most common arrangement for gas turbine engines for use in jet airplanes produces a generally annular flow through the engine, and is designed with a shaft and other supporting structures located in the center of the annular flow path. In a hybrid gas turbine engine, such an axial flow arrangement may include a can-annular arrangement of PDCs in place of the traditional combustors, with the PDCs directing their flow into the purely annular flow passage of the turbine. A bypass cooling system as described herein may be incorporated into such airborne systems.

Other embodiments may include ground-based applications such as power generation. In such systems, pump and chiller systems that are larger, heavier, or require additional infrastructure may be more easily attainable. In other applications, for instance for use on naval vessels, features from both ground based and airborne applications may be included. For example, chillers making use of ambient water as a heat sink may be combined with systems designed to minimize the size of the overall system.

The various embodiments of hot gas path component cooling for pulse detonation combustion gas turbine described above thus provide a way to achieve lower component temperatures in critical areas of the hot gas path. These techniques and systems also allow for more efficient operation of the gas turbine, as there is less need to reduce the duty cycle in order to limit heat buildup.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an intercooler as described with respect to one embodiment can be adapted for use with systems that use multiple downstream destinations for bypass flow. Similarly, the various features described, as well as other known equivalents for each feature, can be mixed and matched by one of ordinary skill in this art to construct additional systems and techniques in accordance with principles of this disclosure.

Although the systems herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

What is claimed is:

1. A gas turbine comprising:
   a pulse detonation combustor, the combustor comprising a combustion tube and a nozzle disposed downstream of the combustion tube;
   a compressor in fluid communication with the combustor and disposed upstream of the combustor;
   a turbine in fluid communication with the combustor and disposed downstream of the combustor;
   a bypass in fluid communication with the compressor, a booster pump, an external surface of the nozzle, a plurality of fins disposed on an inner surface of the nozzle, and an exterior surface of the combustion tube of the pulse detonation combustor, the booster pump disposed downstream of the compressor and upstream of the external surface of the nozzle; and
   an internal passage in each of the plurality of fins fluidly connecting the bypass to the inner surface of the nozzle through openings in each of the plurality of fins;
   wherein a portion of a primary flow from the compressor flows to the booster pump as a bypass flow, the booster pump increases the pressure of the bypass flow allowing the increased pressure bypass flow to flow in a downstream direction to the external surface of the nozzle and then in an upstream direction along the external surface of the combustion tube and reintegrated with the primary flow from the compressor upstream of the combustion tube, at the external surface of the nozzle a portion of the increased pressure bypass flow passes into the internal passage in each of the plurality of fins and out through the openings to mix with an exhaust flow from the combustor.

2. A gas turbine as in claim 1, wherein the fins increase the surface area of the nozzle.

3. A gas turbine as in claim 1, further comprising external fins disposed on the external surface of the nozzle, the increased pressure bypass flow passes over the external fins and the external surface of the nozzle to provide enhanced convective cooling of the nozzle.

4. A gas turbine as in claim 1, wherein the openings in each of the plurality of fins provide film cooling of the fins.

5. A gas turbine as in claim 1, wherein the bypass flow through the bypass is equal to about 10 percent of an inlet flow entering the compressor.

6. A gas turbine as in claim 1 further comprising a chiller configured to reduce the temperature of the bypass flow through the bypass, the chiller disposed along the bypass downstream of the compressor and upstream of the external surface of the nozzle.

7. A gas turbine as in claim 1, wherein the bypass is further in fluid communication with the turbine.

8. A gas turbine as in claim 7, wherein the bypass flow through the bypass is equal to about 12 percent of an inlet flow entering the compressor.

9. A cooling system for a pulse detonation combustor having a combustion tube and a nozzle disposed downstream of the combustion tube, the cooling system comprising;
   a compressor in fluid communication with the pulse detonation combustor and disposed upstream of the pulse detonation combustor;
   a bypass in fluid communication with the compressor, a booster pump, an external surface of the nozzle, a plurality of fins disposed on an inner surface of the nozzle, and an exterior surface of the combustion tube of the pulse detonation combustor, the booster pump disposed downstream of the compressor and upstream of the external surface of the nozzle; and an internal passage in each of the plurality of fins fluidly connecting the bypass to the inner surface of the nozzle through openings in each of the plurality of fins;

wherein a portion of a primary flow from the compressor flows to the booster pump as a bypass flow, the booster pump increases the pressure of the bypass flow allowing the increased pressure bypass flow to flow in a downstream direction to the external surface of the nozzle and then in an upstream direction along the external surface of the combustion tube and reintegrated with the primary flow from the compressor upstream of the combustion tube, at the external surface of the nozzle a portion of the increased pressure bypass flow passes into the internal passage in each of the plurality of fins and out through the openings to mix with an exhaust flow from the combustor.

10. A cooling system as in claim 9, wherein the fins increase the surface area of the nozzle.

11. A cooling system as in claim 9, further comprising external fins disposed on the external surface of the nozzle, the increased pressure bypass flow passes over the external fins and the external surface of the nozzle to provide enhanced convective cooling of the nozzle.

12. A cooling system as in claim 9, wherein the openings in each of the plurality of fins provide film cooling of the fins.

13. A cooling system as in claim 9, wherein the bypass flow through the bypass is equal to about 10 percent of an inlet flow entering the compressor.

14. A cooling system as in claim 9 further comprising a chiller configured to reduce the temperature of the bypass flow through the bypass, the chiller disposed along the bypass downstream of the compressor and upstream of the external surface of the nozzle.

15. A gas turbine comprising:
a pulse detonation combustor, the combustor comprising a combustion tube and a nozzle disposed downstream of the combustion tube;
a compressor comprising a plurality of sequential stages disposed upstream of the combustor;
a primary flow diverted from the compressor at a stage other than a furthest downstream stage of the plurality of sequential stages, the primary flow routed to the combustor;
a turbine in fluid communication with the combustor and disposed downstream of the combustor;
a bypass in fluid communication with the further downstream stage of the compressor, an external surface of the nozzle, a plurality of fins disposed on an inner surface of the nozzle, and an exterior surface of the combustion tube of the pulse detonation combustor; and
an internal passage in each of the plurality of fins fluidly connecting the bypass to the inner surface of the nozzle through openings in each of the plurality of fins;
wherein a remaining flow from the stage of the compressor other than the furthest downstream stage of the compressor flows to the furthest downstream stage of the compressor as a bypass flow, the furthest downstream stage of the compressor increases the pressure of the bypass flow allowing the increased pressure bypass flow to flow in a downstream direction through the bypass to the external surface of the nozzle and then in an upstream direction along the external surface of the combustion tube and reintegrate with the primary flow upstream of the combustion tube, at the external surface of the nozzle a portion of the increased pressure bypass flow passes into the internal passage in each of the plurality of fins and out through the openings to mix with an exhaust flow from the combustor.

\* \* \* \* \*